US 7,955,481 B2
Jun. 7, 2011

(12) United States Patent
Sanchez et al.

(10) Patent No.: US 7,955,481 B2
(45) Date of Patent: Jun. 7, 2011

(54) INTERNAL FLOW CONTROL IN ELECTROLYTIC CELLS

(75) Inventors: Justin Sanchez, Albuquerque, NM (US); Rodney E. Herrington, Albuquerque, NM (US)

(73) Assignee: MIOX Corporation, Albuquerque, NM (US)

( * ) Notice: Subject to any disclaimer, the term of this patent is extended or adjusted under 35 U.S.C. 154(b) by 697 days.

(21) Appl. No.: 11/963,392

(22) Filed: Dec. 21, 2007

(65) Prior Publication Data

US 2008/0164152 A1    Jul. 10, 2008

Related U.S. Application Data

(60) Provisional application No. 60/871,786, filed on Dec. 23, 2006.

(51) Int. Cl.
  *C25B 9/08* (2006.01)
(52) U.S. Cl. ..... 204/263; 204/257; 204/269; 204/275.1; 204/278; 204/258; 204/266; 204/270; 205/474; 205/499; 205/500; 205/502; 205/503; 205/556; 205/615; 205/616; 205/620
(58) Field of Classification Search ............... 204/267, 204/268, 269, 270, 275.1, 278, 263, 257, 204/258, 266; 205/474, 499, 500, 502, 503, 205/556, 615, 616, 620
See application file for complete search history.

(56) References Cited

U.S. PATENT DOCUMENTS

| | | | |
|---|---|---|---|
| 3,234,110 A | 2/1966 | Beer | |
| 3,849,281 A * | 11/1974 | Bennett et al. | 204/268 |
| 4,139,449 A * | 2/1979 | Goto et al. | 204/270 |
| 4,488,948 A | 12/1984 | Larson et al. | |
| RE32,077 E | 2/1986 | deNora et al. | |
| 4,761,208 A | 8/1988 | Gram et al. | |
| 5,385,711 A | 1/1995 | Baker et al. | |
| 6,165,332 A | 12/2000 | Gestermann et al. | |
| 6,309,523 B1 | 10/2001 | Prasnikar et al. | |
| 2005/0287416 A1 | 12/2005 | Ikezoe | |

FOREIGN PATENT DOCUMENTS

| | | |
|---|---|---|
| DE | 19954247 | 5/2000 |
| KR | 10-2003-0081418 | 10/2003 |
| KR | 10-2005-0044403 | 5/2005 |

OTHER PUBLICATIONS

Sasaki, T. et al., "Particle Image Velocimetry Measurement of Bubbly Flow Induced by Alkaline Water Electrolysis", *Proceeding of PSFVIP-4*, Chamonix, France Jun. 3, 2003.

* cited by examiner

*Primary Examiner* — Bruce F Bell
(74) *Attorney, Agent, or Firm* — Philip D. Askenazy; Peacock Myers, P.C.

(57) ABSTRACT

Method and apparatus for controlling two phase flow in electrolytic cells. The present invention is directed to any electrolytic cell, including but not limited to upflow electrolytic cells that comprise parallel electrodes in a vertical orientation. Fluid control strips are preferably added between the anode and cathode electrodes to control flow of fluid and gas bubbles generated between the electrodes in order to avoid the detrimental effects of gas bubbles on the conductivity of the fluid solution, and thereby increase production and operational efficiency of the electrolytic cell.

25 Claims, 8 Drawing Sheets

INTERNAL FLOW CONTROL IN ELECTROLYTIC CELLS

CROSS-REFERENCE TO RELATED APPLICATIONS

This application claims priority to and the benefit of filing of U.S. Provisional Patent Application Ser. No. 60/871,786, entitled "Internal Flow Control In Up-Flow Electrolytic Cells", filed on Dec. 23, 2006, which is incorporated herein by reference.

BACKGROUND OF THE INVENTION

1. Field of the Invention (Technical Field)

The present invention relates to control of two-phase flow in electrolytic cells for production of oxidants.

2. Background Art

Note that the following discussion refers to a number of publications and references. Discussion of such publications herein is given for more complete background of the scientific principles and is not to be construed as an admission that such publications are prior art for patentability determination purposes.

Electrolytic technology utilizing dimensionally stable anodes (DSA) has been used for years for the production of chlorine and other mixed-oxidant solutions. Dimensionally stable anodes are described in U.S. Pat. No. 3,234,110 to Beer, entitled "Electrode and Method of Making Same," whereby a noble metal coating is applied over a titanium substrate.

An example of an electrolytic cell with membranes is described in U.S. Pat. No. RE 32,077 to deNora et al., entitled "Electrode Cell with Membrane and Method for Making Same," whereby a circular dimensionally stable anode is utilized with a membrane wrapped around the anode, and a cathode concentrically located around the anode/membrane assembly.

An electrolytic cell with dimensionally stable anodes without membranes is described in U.S. Pat. No. 4,761,208 to Gram, et al., entitled "Electrolytic Method and Cell for Sterilizing Water."

Commercial electrolytic cells have been used routinely for oxidant production that utilize a flow-through configuration that may or may not be under pressure that is adequate to create flow through the electrolytic device. Examples of cells of this configuration are described in U.S. Pat. No. 6,309,523 to Prasnikar et al., entitled "Electrode and Electrolytic Cell Containing Same," and U.S. Pat. No. 5,385,711 to Baker et al., entitled "Electrolytic Cell for Generating Sterilization Solutions Having Increased Ozone Content".

Research conducted by T. Sasaki, et al, entitled "Particle Image Velocimetry Measurement of Bubbly Flow Induced by Alkaline Water Electrolysis" (in *Proceedings of PSFVIP-4*, Jun. 3-5, 2003, Chamonix, France), describes gas generation in electrolytic cells. This research discusses the effect of hydrogen gas formation between an anode and cathode electrode and the impact of gas bubble formation on the conductivity and efficiency of oxidant generation from the electrolyte feed solution.

SUMMARY OF THE INVENTION

Disclosure of the Invention

The present invention is an electrolytic cell comprising an anode; a cathode; an inlet and an outlet defining a general flow direction of solution in the electrolytic cell; and a first separator disposed between the anode and cathode, the first separator oriented substantially transversely to the general flow direction and comprising a width less than a width of the anode and the cathode; wherein the first separator enhances separation of the liquid solution and gas produced by electrolysis of the solution. The electrolytic cell preferably further comprises a gas collection chamber extending approximately from the first separator to a top of the electrolytic cell. The electrolytic cell of claim 2 preferably further comprises a second separator located downstream of and parallel to the first separator, the second separator comprising a vertical wall adjacent to the gas collection chamber. The electrolytic cell preferably further comprises a second gas collection chamber extending from the second separator to the top of the electrolytic cell. The first separator preferably comprises a gas separation block partially extending into the gas collection chamber. The electrolytic cell preferably further comprises an exit chamber and one or more short circuit prevention blocks partially extending into the exit chamber. The solution level in the exit chamber is preferably lower than a height of the one or more short circuit prevention blocks. The electrolytic cell optionally further comprises an inlet manifold for providing even flow of solution into the electrolytic cell across approximately an entire width of the electrolytic cell. The first separator preferably comprises one or more materials selected from the group consisting of a non-corrosive material, Teflon®, Viton®, Neoprene®, and rubber. The first separator preferably comprises both a flexible material and a rigid material. The first separator optionally partially defines separate electrolysis chambers within the electrolytic cell, each chamber comprising an inlet port and an exit port defining a flow direction within the chamber which is at an angle or transverse to the general flow direction.

The present invention is also a method for enhancing electrolysis efficiency, the method comprising the steps of flowing solution in an electrolytic cell in a general flow direction; interrupting a flow of the solution with a separator oriented substantially perpendicular to the general flow direction and comprising a width less than a width the electrolytic cell; causing the solution to flow at an angle or transverse to the general flow direction; electrolyzing the solution, thereby forming one or more oxidants and a gas; separating the gas from the solution, thereby decreasing the gas concentration in the solution; and collecting the gas near an outlet port of the electrolytic cell while the solution continues to flow in the electrolytic cell. The method preferably further comprises increasing a concentration of the oxidants in the solution. The method preferably further comprises limiting an area in which the gas and the solution flow in the general flow direction to only a portion of the width of the electrolytic cell. The separating step preferably comprises accumulating the gas under the separator. The separating step preferably comprises increasing electrical conductivity of the solution. The method optionally further comprises the step of providing an even flow of solution entering the electrolytic cell across approximately the entire width of the electrolytic cell. The method preferably further comprises the step of providing one or more blocks extending above the electrodes in the electrolytic cell to prevent electrolyzed solution back between the electrodes. The method preferably further comprises the step of adjusting the height of the outlet port over a level of solution so that the solution level is lower than a height of the blocks. The collecting step preferably comprises flowing the separated gas over the blocks to the outlet port. The method optionally further comprises the step of providing separate electrolysis chambers. The method optionally further comprises the step of the separators preventing some of the separated gas generated in a first electrolysis chamber from flowing into a second electrolysis chamber.

An object of the present invention is to control the flow of liquid and the distribution of gas bubbles, preferably by the strategic location of flow control strips, between the anode and cathode electrodes in an electrolytic cell.

Another object of the present invention is to provide a flow control scheme for separating the gas from the bulk fluid solution.

Advantages of the present invention include improved conductivity of the electrolyte solution, increased production and concentration of oxidants in the electrolytic cell, improved operational efficiency, and reduced operational cost of the system. The higher concentration of oxidants in the bulk fluid solution means that oxidant storage tanks can preferably be made smaller for the equivalent oxidation energy, and the size of pumps required for injection or transfer of the oxidants to the fluid to be treated can preferably also be smaller, thereby reducing the overall capital cost of the installation.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Figure 1:
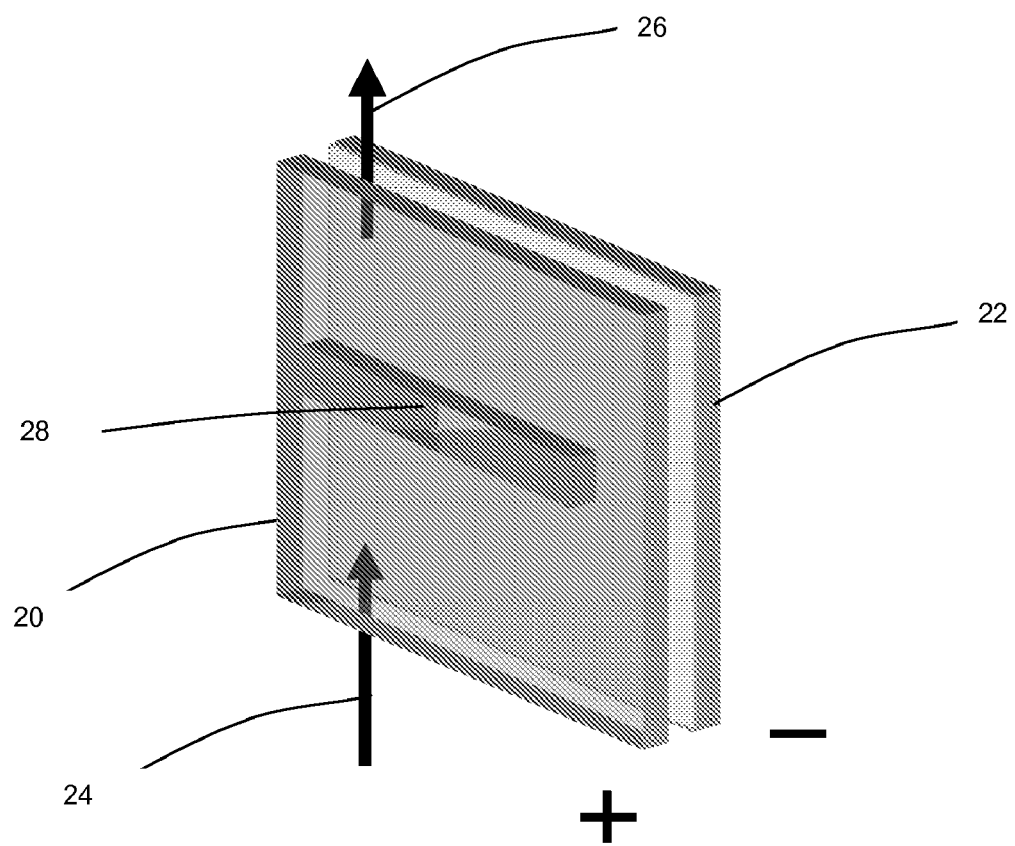
FIG. 1 is a view of a set of electrodes in an electrolytic cell.

Best Modes for Carrying out the Invention

The present invention comprises an electrolytic cell with fluid and gas separation devices to improve the operational efficiency of electrolytic cells, including but not limited to horizontal or upflow cells. The method and apparatus is applicable to cells comprising either bi-polar (intermediate electrodes) or mono-polar electrode configurations.

Certain electrolytic cells apply electrical energy to an aqueous halide salt solution between an anode plate and cathode plate to convert the aqueous halide salt solution to oxidants that can be used for disinfection. A natural product of electrolysis in an aqueous media is hydrogen that is produced at the cathode surface. Electrolyte solution can flow in an electrolytic cell either horizontally, vertically, or diagonally. In an up-flow configuration, the hydrogen bubbles typically flow upward in the same direction as the fluid flow, forming a two phase flow. As the two phase flow solution moves from the bottom of the electrolytic cell space to the top of the electrolytic cell space, the concentration of gas bubbles increases, thereby affecting electrolysis differently at the bottom of the cell than at the top of the cell. Other factors that affect electrolysis in up-flow cells depending on vertical position in the cell include an increasing fluid temperature profile as the fluid moves from the bottom to the top and a varying concentration of the conductivity of the halide salt as the halide ions are electrolytically converted to oxidants. In an electrolytic cell that utilizes a control scheme to maintain a constant current, the current density at various points on the electrode surfaces varies to maintain the overall current flow into the electrolytic cell. All of these effects provide a complex system that further impacts the current density at any point on the electrode surface, thereby influencing the overall operational efficiency of the system.

Gas bubble density between the anode and cathode electrodes has a major impact on the conductivity of the two phase solution. By isolating, separating, or controlling the gas in the two phase solution, overall electrolyte conversion efficiency can preferably be improved. Evidence for this improved operational efficiency typically includes an increase in the concentration of oxidants in the fluid stream exiting the electrolytic cell. Since the overall production of oxidants from an electrolytic cell is determined by the oxidant concentration and the flow rate of the bulk fluid solution, the operational efficiency of the system can easily be determined. Experimental results on up-flow cells have demonstrated an increase in oxidant concentration preferably of greater than 20%, more preferably greater than 30%, even more preferably more than 40%, and most preferably greater than 50% at the same fluid flow rate when up-flow electrolytic cells are configured with flow separation devices of the present invention between the anode and cathode electrodes within the cell.

Figure 2:
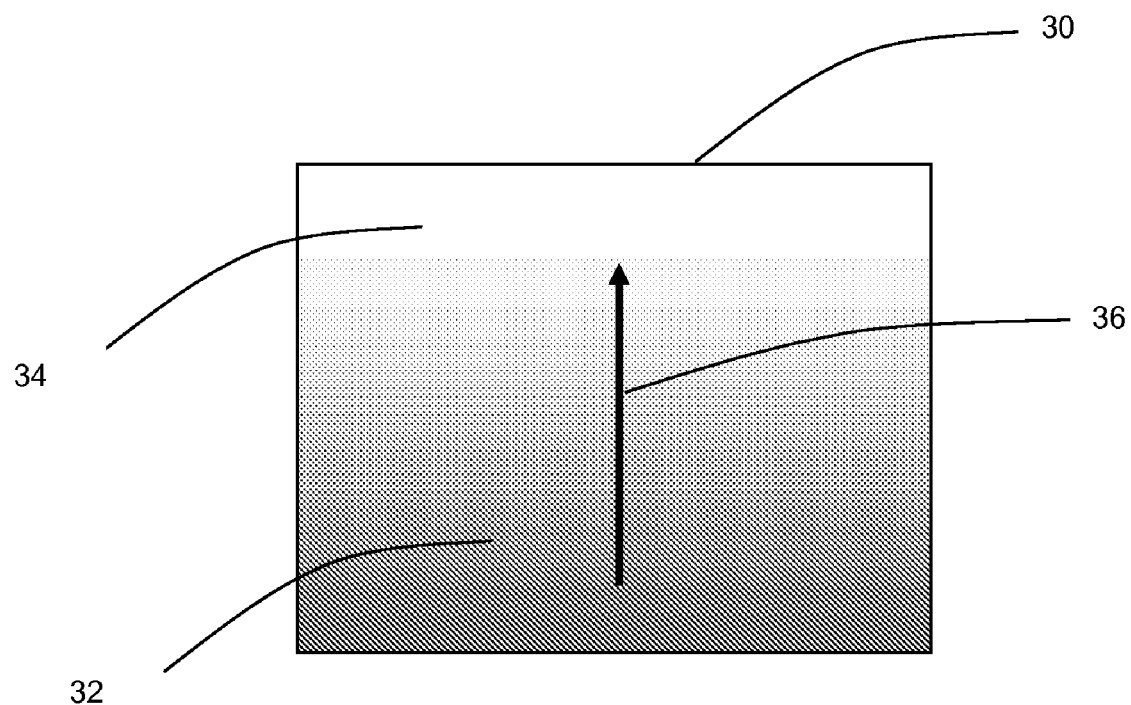
FIG. 2 is an elevation view of an electrode in an electrolytic cell as viewed between the electrode plates at the electrolytic solution comprising two phase flow with liquid and gas.

FIG. 1 is a basic view of an electrolytic cell with vertically oriented electrodes and upward fluid flow between the electrodes. In normal operation, anode 20 directly opposes cathode 22. In an embodiment of the present invention, sodium chloride brine solution 24 enters the electrolytic cell at the bottom, and oxidants 26 exit at the top of the cell. Electrical energy is applied to anode 20 and cathode 22 to electrolyze sodium chloride brine solution 24, thereby producing oxidants 26. Flow separator 28 is preferably disposed between anode 20 and cathode 22 and causes gas and fluid to be diverted to the right end of the electrode space between anode 20 and cathode 22. In FIG. 1, the electrolytic cell housing that confines the liquid solution and houses anode 20 and cathode 22 is not shown. It will be readily apparent to those versed in the art that the brine solution may consist of any halide salt, such as sodium chloride or potassium chloride, and further that these benefits may accrue to other electrolytic processes such as those used for producing chlorine dioxide or other oxidants such as mixed oxidants. FIG. 2 is a view of the fluid solution between the anode and cathode in the electrolytic cell as defined by cathode electrode boundary 30. Fluid 36, which flows upward in the cell, comprises few gas bubbles as demonstrated by the darkened region of electrolyte 32. As fluid 36 flows upward, the density of gas bubbles increases and oxidant 34 is produced. The region comprising oxidant 34 is defined by the light region at the top of the cell. The region at the top of the cell has a much higher concentration of gas in the fluid solution than the region at the bottom of the cell.

Figure 3:
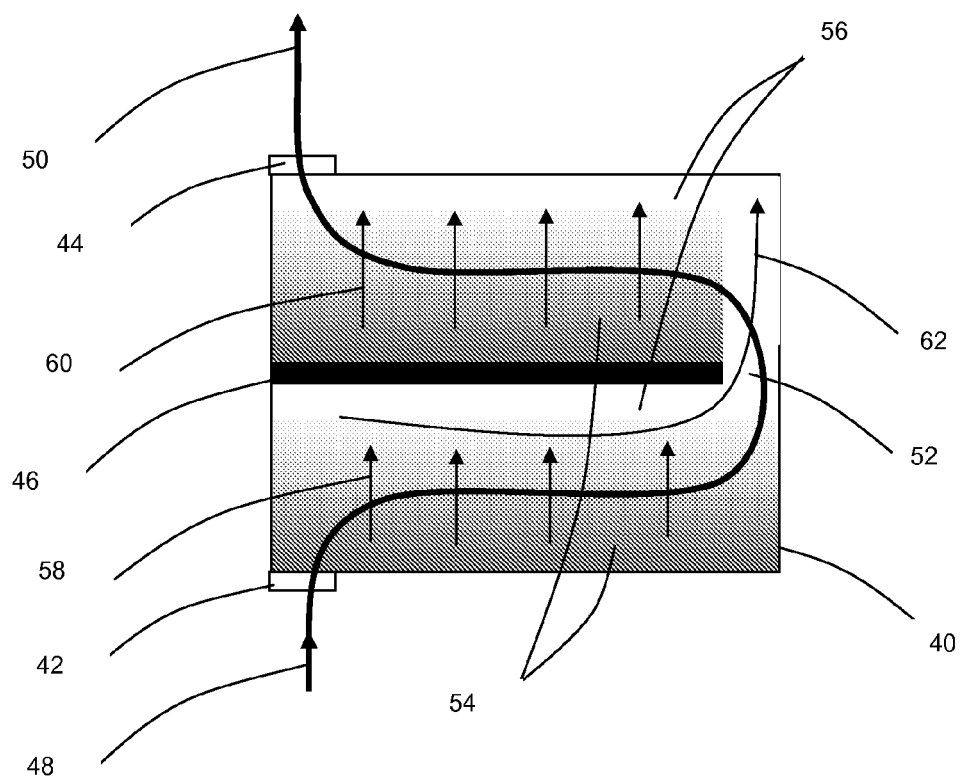
FIG. 3 is a view of the space between electrodes in an electrolytic cell with a horizontal flow separator.

In the embodiment of the present invention shown in FIG. 3, electrolytic cell 40 preferably comprises inlet port 42 and outlet port 44. The fluid channel space between the anode and cathode electrodes within electrolytic cell 40 preferably incorporates fluid separator 46. Electrolyte 48 preferably enters the cell through inlet port 42 and flows approximately horizontally to the right across the space between the anode and cathode, during which time electrolysis is occurring, converting electrolyte 48 to oxidant solution 50. However, electrolyte 48 and gas bubbles 58 are preferably blocked from vertical flow by fluid separator 46. As gas bubbles 58 rise in electrolyte 48 within the cell, gas bubbles 58 accumulate under fluid separator 46. Two phase flow of electrolyte 48 and gas 62 occurs upward at the right end of fluid separator 46 through open channel 52. Due to the buoyancy of gas, gas bubbles 60 are preferably separated from the bulk fluid solution and accumulate at the top of electrolytic cell 40. Electrolyte 48, during conversion to oxidant solution 50, preferably flows to the left across the top of fluid separator 46. As electrolyte 48 continues to flow between the anode and cathode, gas bubbles 60 continue to be produced in the process and continue to accumulate at the top of electrolytic cell 40. The liquid regions in the cell are defined by dark areas 54, and the gas rich regions are defined by light areas 56. Two phase oxidant solution 50 ultimately leaves electrolytic cell 40 via discharge port 44. As gas bubbles 62 are separated from electrolyte 48 within electrolytic cell 40, the electrical conductivity of electrolyte 48 preferably increases by virtue of the larger and denser fluid regions defined by dark areas 54.

Figure 4:
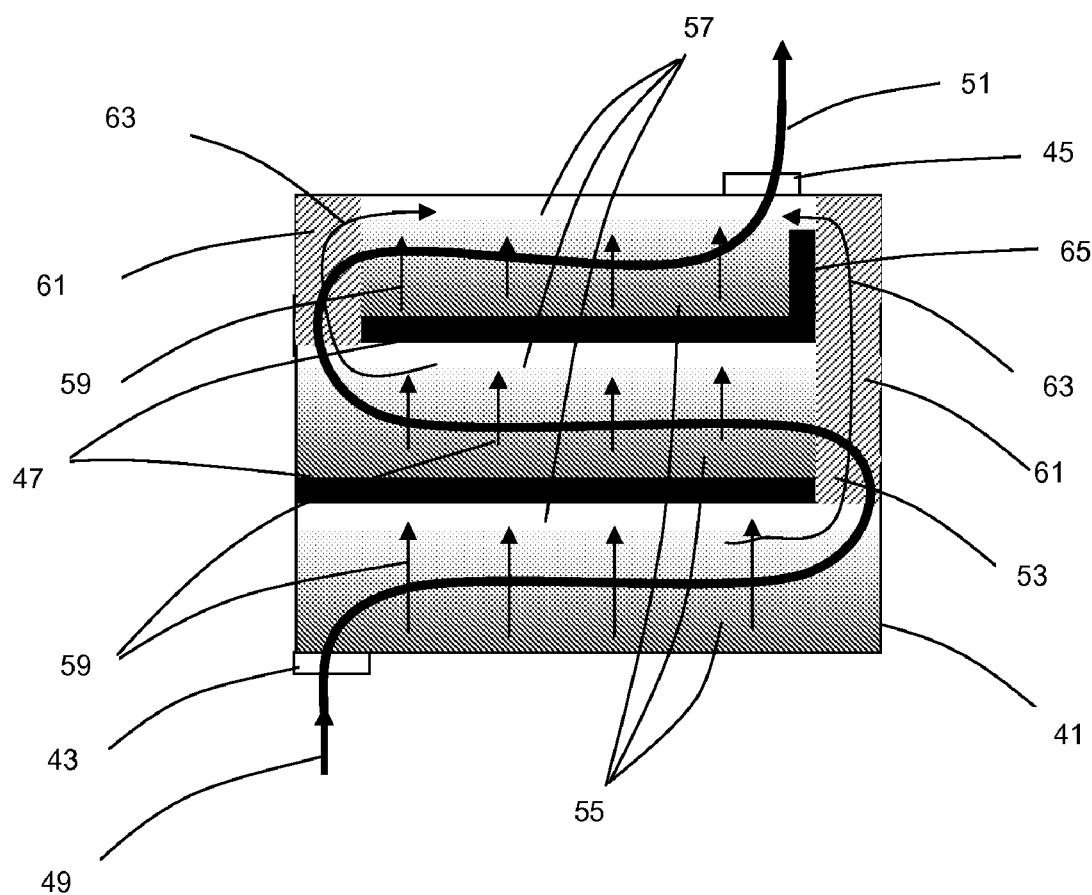
FIG. 4 is a view of the space between electrodes in an electrolytic cell with multiple horizontal flow separators.

In the embodiment of the present invention shown in FIG. 4, electrolytic cell 41 preferably comprises inlet port 43 and outlet port 45. The fluid channel space between the anode and cathode electrodes within electrolytic cell 41 preferably incorporates fluid separators 47. Electrolyte 49 preferably enters through inlet port 43 and flows horizontally to the right across the space between the anode and cathode, during which time electrolysis is occurring, converting electrolyte 49 to oxidant solution 51. Electrolyte 49 and gas bubbles 59 are preferably blocked from vertical flow by fluid separators 47. As gas bubbles 59 rise in electrolyte 49 within the cell, gas bubbles 59 accumulate under fluid separators 47. Two phase flow of electrolyte 49 and gas 63 flow upward at the right end of lower fluid separator 47 through open channel 53. Due the buoyancy of gas, gas bubbles 63 are preferably separated from the bulk fluid solution and accumulate at the top of electrolytic cell 41. The upper fluid separator preferably comprises vertical wall 65 to facilitate separation of gas 63 from electrolyte 49 in the upper chamber.

Electrolyte 49 preferably continues to flow to the left across the top of lower fluid separator 47 in the middle compartment of electrolytic cell 41. As electrolyte 49 continues to flow to the left between the anode and cathode, gas bubbles 59 continue to be produced in the process and accumulate on the underside of upper fluid separator 47. Electrolyte 49 continues to flow to the left and up around the left end of upper fluid separator 47 and in to the top chamber of electrolytic cell 41. The liquid regions in the cell are defined by dark areas 55, and the gas rich regions are defined by light areas 57. Two phase oxidant solution 51 ultimately leaves electrolytic cell 41 via discharge port 45. As gas bubbles 63 are separated from electrolyte 49 within electrolytic cell 41, the electrical conductivity of electrolyte 49 increases by virtue of the larger and denser fluid regions defined by dark areas 55.

In electrolytic cells having a bi-polar configuration, there are multiple electrodes within the electrolytic cell. With bi-polar cells, gas collection chambers 61 may accumulate gas from several electrode pairs, and electrodes preferably do not extend into gas collection chambers 61. By avoiding the presence of electrodes in gas collection chambers 61, electrical short circuiting will not occur between different electrode pairs, or between the primary anode and cathode in the bi-polar cell.

Figure 5:
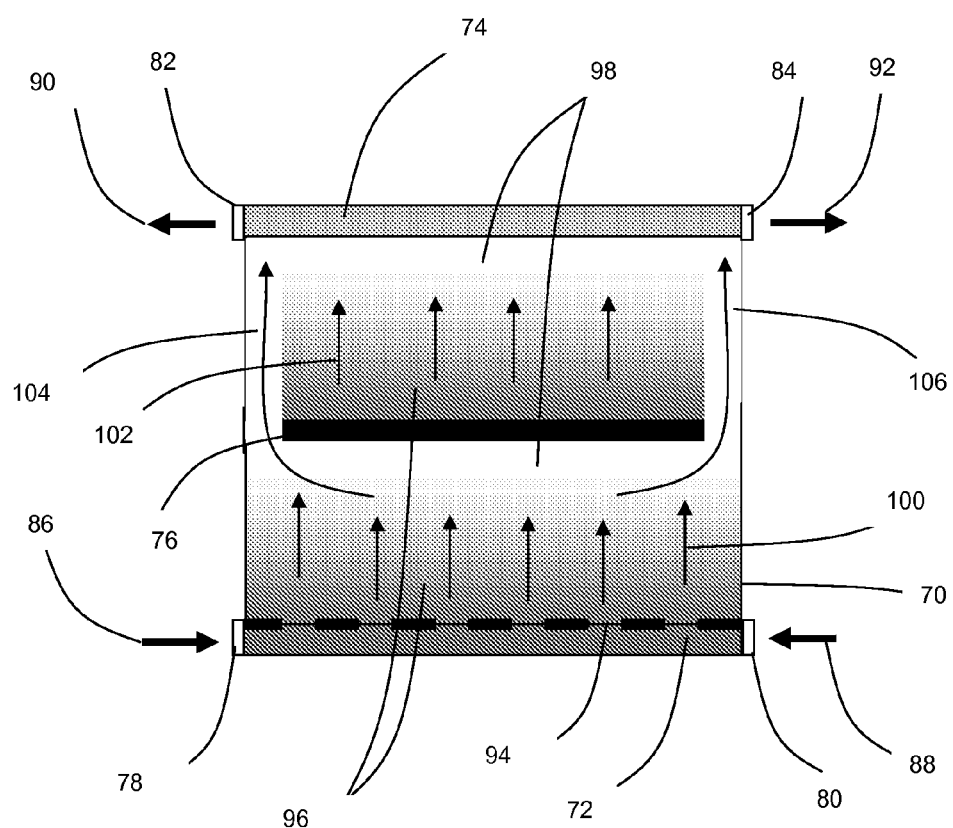
FIG. 5 is a view of the space between electrodes in an electrolytic cell with a horizontal flow separator evenly spaced in the electrode compartment.

In the embodiment of the present invention shown in an elevation view in FIG. 5, fluid separator 76 is preferably equally centered left to right within electrolytic cell 70. Electrolytic cell 70 preferably comprises inlet manifold 72 and outlet manifold 74. Inlet manifold 72 preferably further comprises inlet ports 78, 80. Outlet manifold 74 preferably further comprises outlet ports 82, 84. Inlet manifold 72 preferably comprises one or more inlet passages 94 that preferably provide even distribution and flow of liquid electrolyte 100 across approximately the entire width of electrolytic cell 70. In operation, electrolyte 86, 88 preferably enters electrolytic cell 70 through inlet ports 78, 80 into inlet manifold 72 and through inlet passages 94 before entering the space between the anode and cathode of electrolytic cell 70. As liquid electrolyte 100 is electrolyzed between the anode and cathode electrodes of electrolytic cell 70, gas is generated at the cathode. With gas mixed in with liquid electrolyte 100, two phase flow conditions exist. As liquid electrolyte 100 continues to flow upward in the cell, the concentration of gas in liquid electrolyte 100 increases as liquid electrolyte 100 is converted to oxidant. Liquid electrolyte 100 with low gas concentration is characterized by low gas regions 96. As liquid electrolyte 100 is converted to oxidant, high gas concentration is characterized by high gas regions 98. As liquid electrolyte 100 flows upward within electrolytic cell 70, the two phase liquid and gas solution impinges on the underside of fluid separator 76. Gas is directed to both ends of fluid separator 76, and gas flows upward at side passages 104 and 106. Hydraulic and gas buoyant conditions within electrolytic cell 70 preferably cause oxidant 102 to accumulate on the top side of fluid separator 76. Oxidant 102 continues to be electrolyzed and gas bubbles continue to form as oxidant 102 flows upward in electrolytic cell 70, and finally into outlet manifold 74. Oxidant 90, 92 is preferably discharged from outlet manifold 74 via outlet manifold ports 82, 84.

Figure 6:
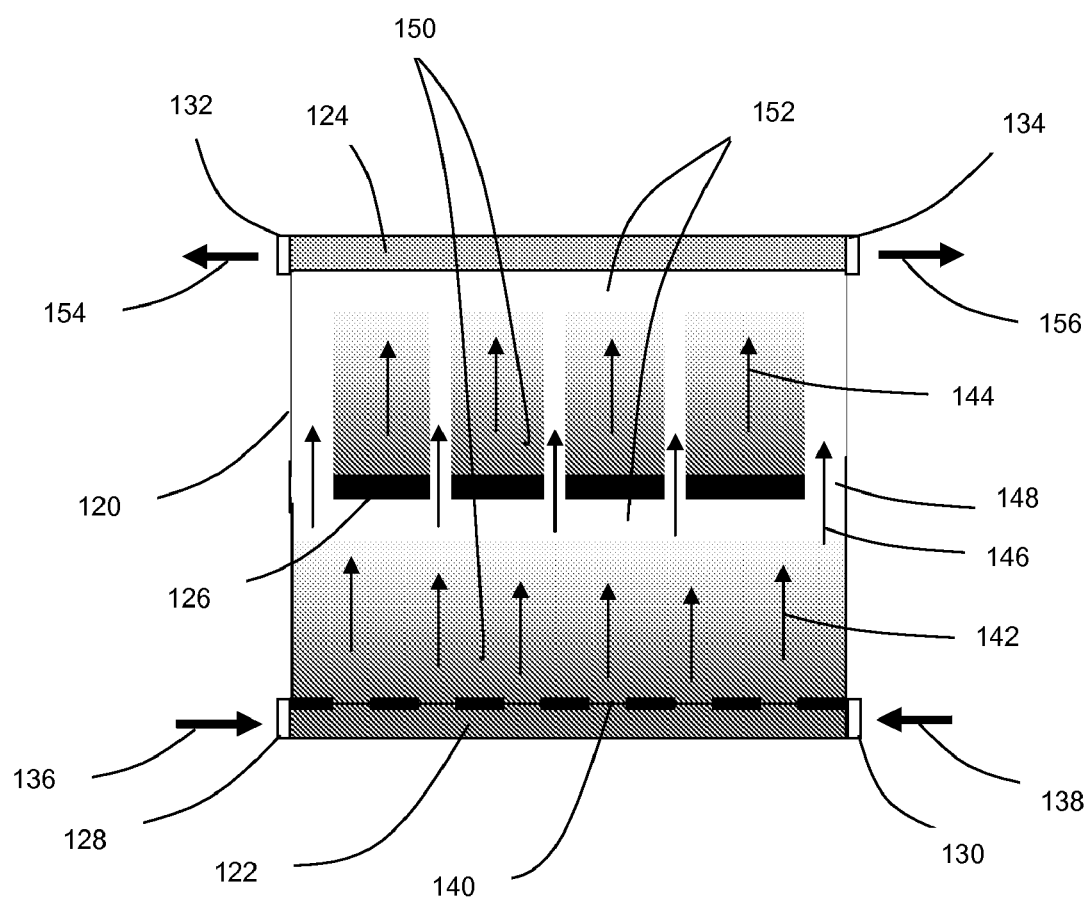
FIG. 6 is a view of the space between electrodes in an electrolytic cell with multiple horizontal flow separators in the electrode compartment.

In another embodiment of the present invention, shown in an elevation view in FIG. 6, multiple fluid separators 126 are disposed from left to right within electrolytic cell 120. Electrolytic cell 120 preferably comprises inlet manifold 122 and outlet manifold 124. Inlet manifold 122 preferably comprises inlet ports 128, 130. Outlet manifold 124 preferably comprises outlet ports 132, 134. Inlet manifold 122 preferably comprises one or more inlet passages 140 that preferably provide even distribution and flow of liquid electrolyte 142 across approximately the entire width of electrolytic cell 120. In operation, electrolyte 136, 138 enters electrolytic cell 120 through inlet ports 128, 130 into inlet manifold 122 and through inlet passages 140 before entering the space between the anode and cathode of electrolytic cell 120. As liquid electrolyte 142 is electrolyzed between the anode and cathode electrodes of electrolytic cell 120, gas is generated at the cathode electrode. With gas mixed in with liquid electrolyte 142, two phase flow conditions exist. As liquid electrolyte 142 continues to flow upward in the cell, the concentration of gas in liquid electrolyte 142 increases as liquid electrolyte 142 is converted to oxidant. Liquid electrolyte 142 with low gas concentration is characterized by low gas regions 150.

As liquid electrolyte 142 is converted to oxidant, high gas concentration is characterized by high gas regions 152. As liquid electrolyte 142 flows upward within electrolytic cell 120, the two phase liquid and gas solution impinges on the underside of fluid separators 126. Gas is directed to the ends of fluid separators 126, and gas 146 preferably flows upward through multiple passages 148. Hydraulic and gas buoyant conditions within electrolytic cell 120 preferably cause oxidant 144 to accumulate on the top side of fluid separators 126. Oxidant 144 continues to be electrolyzed and gas bubbles continue to form as oxidant 144 flows upward in electrolytic cell 120, and finally into outlet manifold 124. Oxidant 154, 156 is preferably discharged from outlet manifold 124 via outlet manifold ports 132, 134.

Figure 7:
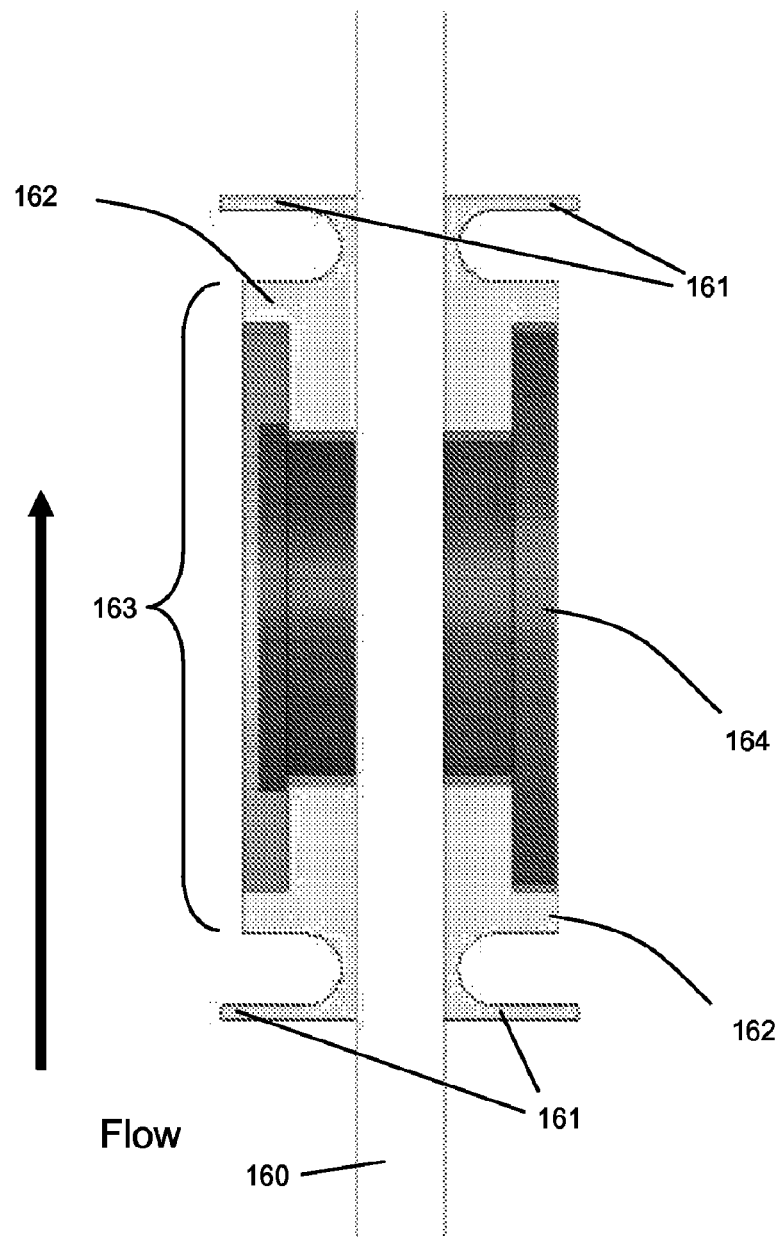
FIG. 7 is a cross section of a flow separation strip within an electrolytic cell.

FIG. 7 shows a cross section of an embodiment of fluid separator 162. Fluid separator 162 is preferably attached to both sides of electrode 160 and is preferably held in place with connection button 164, preferably via holes drilled through electrode 160. Fluid separator 162 preferably comprises a non-corrosive material such as Teflon® or Viton®. Fluid separator 162 preferably comprises flexible sections 161, which preferably bend and/or compress to provide a fluid seal when compressed between electrodes. Fluid separator 162 also preferably comprises rigid section 163 to ensure the electrodes are spaced together correctly. A different embodiment of a fluid separator comprises a compressible non-corrosive material such as Neoprene® or rubber which is held in place either with a corrosion resistant adhesive and/or connection buttons 164 as described above.

Figure 8:
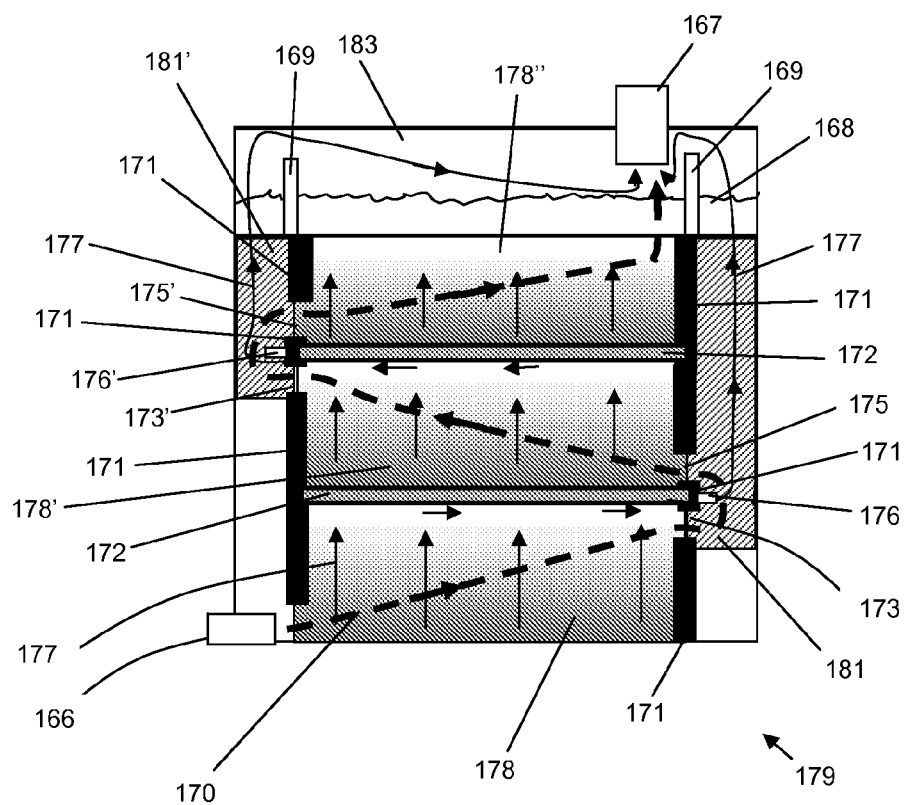
FIG. 8 is a view of the space between electrodes in an electrolytic cell with multiple horizontal flow separators in the electrode compartment.

FIG. 8 shows a cross section of another embodiment of the present invention. Electrolyte, indicated by flow direction 170 enters electrolytic cell 179 preferably through inlet port 166. It then passes through the first electrolysis chamber 178 which are separated by fluid separators 172. The fluid separator preferably forces both the electrolyte and gas approximately horizontally and through first electrolysis chamber exit port 173. Due to buoyancy, the gas rises as indicated by arrows 177. Both the gas and electrolyte then enter gas separation chamber 181, preferably in which no electrolysis occurs, and the gas, due to its inherent buoyancy in fluid, is separated from the electrolyte before the electrolyte enters second electrolysis chamber 178' preferably through electrolysis chamber entry port 175. This separation is preferably aided by gas separation block 176 which works to maximize the distance from where the gas is finally able to move vertically in gas separation chamber 181 and electrolysis chamber entry port 175. This preferably prevents the gas from traveling back into electrolysis chamber 178, thereby minimizing the interference of the gas with the rest of the electrolysis process. The electrolyte travels back across second electrolysis chamber 178' which is preferably bounded on the top and bottom by fluid separators 172. More gas is generated within chamber 178' as the electrolysis process continues, but this gas is separated as described before in gas separation chambers 181', aided by electrolysis chamber exit port 173', electrolysis chamber entry port 175', and gas separation block 176'.

Electrolyte level 168 in electrolytic cell 179 is preferably determined by the height of the combined gas-electrolyte exit port 167 in exit chamber 183. Increasing this height increases electrolyte level 168 in the cell, and it is preferable that electrolyte level 168 is sufficiently high to provide good electrolyte coverage of the electrodes in final electrolysis chamber 178", but not so high that the electrolyte is above the electrodes and therefore not subjected to electrolysis. Above electrolyte level 168, gas from both gas separation chambers 181, 181' is preferably combined with gas from the third electrolysis chamber 178" and exits the cell by first passing over short-circuit prevention blocks 169 and through the combined gas-electrolyte exit port 167. Electrolyte 170 is forced to run through all three electrolysis chambers 178 by keeping fluid level 168 below the top of short-circuit prevention blocks 169. This long path, coupled with the action of separating gas throughout the electrolytic cell, improve the efficiency and concentration performance of the electrolytic cell.

The electrolyte can short circuit from the first or second gas separation chambers to combined gas-electrolyte exit port 167 over the top of short-circuit prevention blocks 169 in the event that one or more of the following is true: a) the electrolyte flow rate is too high, b) the combined gas-electrolyte exit port is too high, enabling electrolyte level 168 to be too high, c) gas separation chambers 181, 181' are too small, making the velocity of the fluid in them too high to allow adequate gas separation. Thus electrolyte level 168 is preferably optimized to provide adequate electrode coverage with electrolyte while at the same time maintaining electrolyte level 168 below the top of short circuit prevention block 169. Optimizing the height of combined gas-electrolyte exit port 167 enables the gas to exit gas separation chambers 181, 181' and flow over the top of gas separation blocks 176, 176' and into combined gas-electrolyte exit port 167 while electrolyte 170 flows through all of the electrolysis chambers. Fluid separators 172 and gas separation blocks 176, 176' are preferably held in place by mechanically interleaving them directly to electrode plate holders 171. Electrode plate holders 171 can also be used to accurately space and/or provide electrical isolation between primary and/or intermediate electrodes. In addition, is fluid separators 172 preferably comprise a shape which requires the gas evolved in one electrolysis chamber to rise above the entry port of the next electrolysis chamber, thereby increasing the effectiveness of the gas separation.

Although the embodiment shown in FIG. 8 comprises three electrolysis chambers (i.e. the electrolyte passes across the electrodes three times), any number of electrolysis chambers from 1 to 20, or even more, may be employed. The most cost effective results, however, have been obtained with fewer than 4 passes or chambers.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. An electrolytic cell comprising:
   an anode;
   a cathode;
   an inlet and an outlet defining a general flow direction of solution in said electrolytic cell, said general flow direction substantially parallel to a planar orientation of said anode and said cathode; and
   a first separator disposed between the anode and cathode, said first separator oriented substantially transversely to said general flow direction and said planar orientation;
   wherein said first separator enhances separation of the liquid solution and gas produced by electrolysis of the solution.

2. The electrolytic cell of claim 1 further comprising a gas collection chamber extending approximately from said first separator to a top of said electrolytic cell.

3. The electrolytic cell of claim 2 further comprising a second separator located downstream of and parallel to said first separator, said second separator comprising a vertical wall adjacent to said gas collection chamber.

4. The electrolytic cell of claim 3 further comprising a second gas collection chamber extending from said second separator to said top of said electrolytic cell.

5. The electrolytic cell of claim 2 wherein said first separator comprises a gas separation block partially extending into said gas collection chamber.

6. The electrolytic cell of claim 2 further comprising an exit chamber.

7. The electrolytic cell of claim 6 further comprising one or more short circuit prevention blocks partially extending into said exit chamber.

8. The electrolytic cell of claim 7 wherein a solution level in said exit chamber is lower than a height of said one or more short circuit prevention blocks.

9. The electrolytic cell of claim 1 further comprising an inlet manifold for providing even flow of solution into said electrolytic cell across approximately an entire width of said electrolytic cell.

10. The electrolytic cell of claim 1 wherein said first separator comprises one or more materials selected from the group consisting of a non-corrosive material, Teflon®, Viton®Neoprene®, and rubber.

11. The electrolytic cell of claim 1 wherein said first separator comprises both a flexible material and a rigid material.

12. The electrolytic cell of claim 1 wherein said first separator partially defines separate electrolysis chambers within said electrolytic cell, each chamber comprising an inlet port and an exit port defining a flow direction within said chamber which is at an angle or transverse to said general flow direction.

13. The electrolytic cell of claim 1 wherein said electrolytic cell is an up-flow cell and said anode and said cathode have a vertical planar orientation.

14. A method for enhancing electrolysis efficiency, the method comprising the steps of:
flowing solution in an electrolytic cell comprising electrodes in a general flow direction substantially parallel to a planar orientation of the electrodes;
interrupting a flow of the solution with a separator oriented substantially perpendicular to the general flow direction;
causing the solution to flow at an angle or transverse to the general flow direction;
electrolyzing the solution, thereby forming one or more oxidants and a gas;
separating the gas from the solution, thereby decreasing the gas concentration in the solution; and
collecting the gas near an outlet port of the electrolytic cell while the solution continues to flow in the electrolytic cell.

15. The method of claim 14 further comprising increasing a concentration of the oxidants in the solution.

16. The method of claim 14 further comprising limiting an area in which the gas and the solution flow in the general flow direction to only a portion of the width of the electrolytic cell.

17. The method of claim 14 wherein the separating step comprises accumulating the gas under the separator.

18. The method of claim 14 wherein the separating step comprises increasing electrical conductivity of the solution.

19. The method of claim 14 further comprising the step of providing an even flow of solution entering the electrolytic cell across approximately the entire width of the electrolytic cell.

20. The method of claim 14 further comprising the step of providing one or more blocks extending above electrodes in the electrolytic cell to prevent electrolyzed solution back between the electrodes.

21. The method of claim 20 further comprising the step of adjusting the height of the outlet port over a level of solution so that the solution level is lower than a height of the blocks.

22. The method of claim 20 wherein the collecting step comprises flowing the separated gas over the blocks to the outlet port.

23. The method of claim 14 further comprising the step of providing separate electrolysis chambers.

24. The method of claim 23 further comprising the step of the separators preventing some of the separated gas generated in a first electrolysis chamber from flowing into a second electrolysis chamber.

25. The method of claim 14 wherein the electrolytic cell is an up-flow cell and the electrodes have a vertical planar orientation.

* * * * *